United States Patent [19]

Brazeal

[11] 4,359,155

[45] Nov. 16, 1982

[54] BOTTLE TRANSFER ASSEMBLY

[75] Inventor: Earl H. Brazeal, Smyrna, Del.

[73] Assignee: Hoover Universal, Inc., Ann Arbor, Mich.

[21] Appl. No.: 157,570

[22] Filed: Jun. 9, 1980

[51] Int. Cl.³ .............................................. B65G 47/24
[52] U.S. Cl. .................................................... 198/409
[58] Field of Search ................................ 198/406–409, 198/411, 456, 498; 414/224, 680–681, 780–781, 754; 221/171, 173

[56] References Cited

U.S. PATENT DOCUMENTS 1,480,063  1/1924  Hall et al. ............................. 198/408
1,889,846  12/1932  Wright ................................... 198/409

*Primary Examiner*—Robert B. Reeves
*Assistant Examiner*—Douglas D. Watts
*Attorney, Agent, or Firm*—Olsen and Stephenson

[57] ABSTRACT

Apparatus for handling blow molded bottles which are to be transferred from a horizontal position at a lower level to a vertical upright position at a higher level, comprising a plurality of bottle carriers (20), transfer means (22) connected to the carriers for movement of the latter between the lower and higher levels, and arcuate slide members (26) which function to retain the bottles in the carriers as the bottles slide on the slide members during transfer from the lower to the higher level, the slide members terminating immediately prior to the carriers arriving at the higher level so that the bottles can be discharged bottom-first in upright positions at the upper level.

10 Claims, 5 Drawing Figures

BOTTLE TRANSFER ASSEMBLY

TECHNICAL FIELD

The present invention relates to article handling apparatus, and more particularly to a bottle transfer assembly for transferring finished plastic bottles from a horizontal position at a lower level to a vertical upright position at a higher level and onto a suitable conveyance as required for performing subsequent operations.

BACKGROUND OF THE INVENTION

It is known in the art to blow mold thermoplastic organic resins to form bottles and similar containers. In known blow molding apparatus, a plurality of bottles may be formed simultaneously in a plurality of parallel aligned molds from which pluralities of finished bottles may be dropped downwardly intermittently through chutes from which the bottles are discharged bottom-first in horizontal positions. There is a need in the industry to provide improved apparatus which can receive these bottles as they are intermittently discharged and transfer them to a new location to permit subsequent operations to be performed in connection with them.

SUMMARY OF THE INVENTION

According to one form of the present invention, a bottle transfer assembly is provided for transferring bottles from a horizontal position at a first elevation to a vertical upright position at a second elevation and releasing the upright bottles at the second elevation onto a suitable receiving member. The assembly comprises a carrier, transfer means connected to the carrier for imparting reciprocal movement to the carrier in a path defined by a quarter of a circle located in a vertical plane wherein one radius of the quarter circle is horizontal and another radius of the quarter circle is vertical. An arcuate slide member is located in the vertical plane in generally parallel relationship to and radially of the path. The carrier has a generally tubular shape and is open at opposite ends. The axis of the carrier extends towards the center of the circle so that a bottle in a horizontal position can be inserted bottom first into one end of the carrier at the elevation of the horizontal radius and then, with the bottom of the bottle traveling on the slide member, can be transferred by the transfer means to the second elevation at the vertical radius. The slide member terminates immediately prior to the vertical radius so that the bottle will travel off the slide member and be released bottom first from the other end of the carrier at the second elevation for deposit of the bottle in an upright position on the receiving member.

In a preferred form of the invention, the bottle transfer assembly has a plurality of carriers which are arranged in parallel spaced relation, said transfer means being connected to the carriers for imparting reciprocal movement simultaneously to the carriers. A plurality of arcuate slide members are provided corresponding to the one slide member, each slide member being associated with a carrier for receiving in sliding engagement the bottom of a bottle carried in the associated carrier. Thus, a plurality of bottles can be received simultaneously from the plurality of molds of the blow molding machine with which the bottle transfer assembly is associated, and the plurality of bottles can then be transferred as indicated to a receiving member. The bottles will be discharged in an upright position in alignment, and to permit them to be guided transversely in the aligned relationship, a transverse slide member is located perpendicularly to the vertical planes associated with the carriers and below the respective elevated terminal ends of the arcuate slide members for engagement by the side walls of the bottles released from the carriers. Suitable means can then be provided at the receiving member for transferring the aligned bottles from the bottle transfer assembly.

To permit the carriers to continue to support the bottles in upright positions after being discharged onto the receiving member, the receiving member preferably will be located a relatively short distance below the terminal ends of the arcuate slide members so that after the bottles are dropped from the arcuate slide members, they will remain partially confined within the carriers.

To allow the bottle transfer assembly to return the carriers to their horizontal positions while the bottles are still on the receiving member at the discharge end of the bottle transfer assembly, the carriers are notched in the lower portion of the tubular wall an amount sufficient to provide clearance for passage of the upper ends of the released bottles, thereby permitting return movement of the carriers to be initiated toward their horizontal positions without the carriers engaging the lowered bottles.

Thus, it is among the objects of the present invention to provide an improved bottle transfer assembly for transferring bottles from one elevation to another, and particularly one that is adapted for use with a known type of blow molding machine wherein a plurality of finished bottles are dropped downwardly intermittently through chutes from which the bottles are discharged bottom first in horizontal positions.

Other objects of this invention will appear in the following description and appended claims, reference being had to the accompanying drawings forming a part of this specification wherein like reference characters designate corresponding parts in the several views.

BRIEF DESCRIPTION OF THE DRAWINGS

FIG. 5 is a perspective view of one carrier.

DESCRIPTION OF THE PREFERRED EMBODIMENT

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
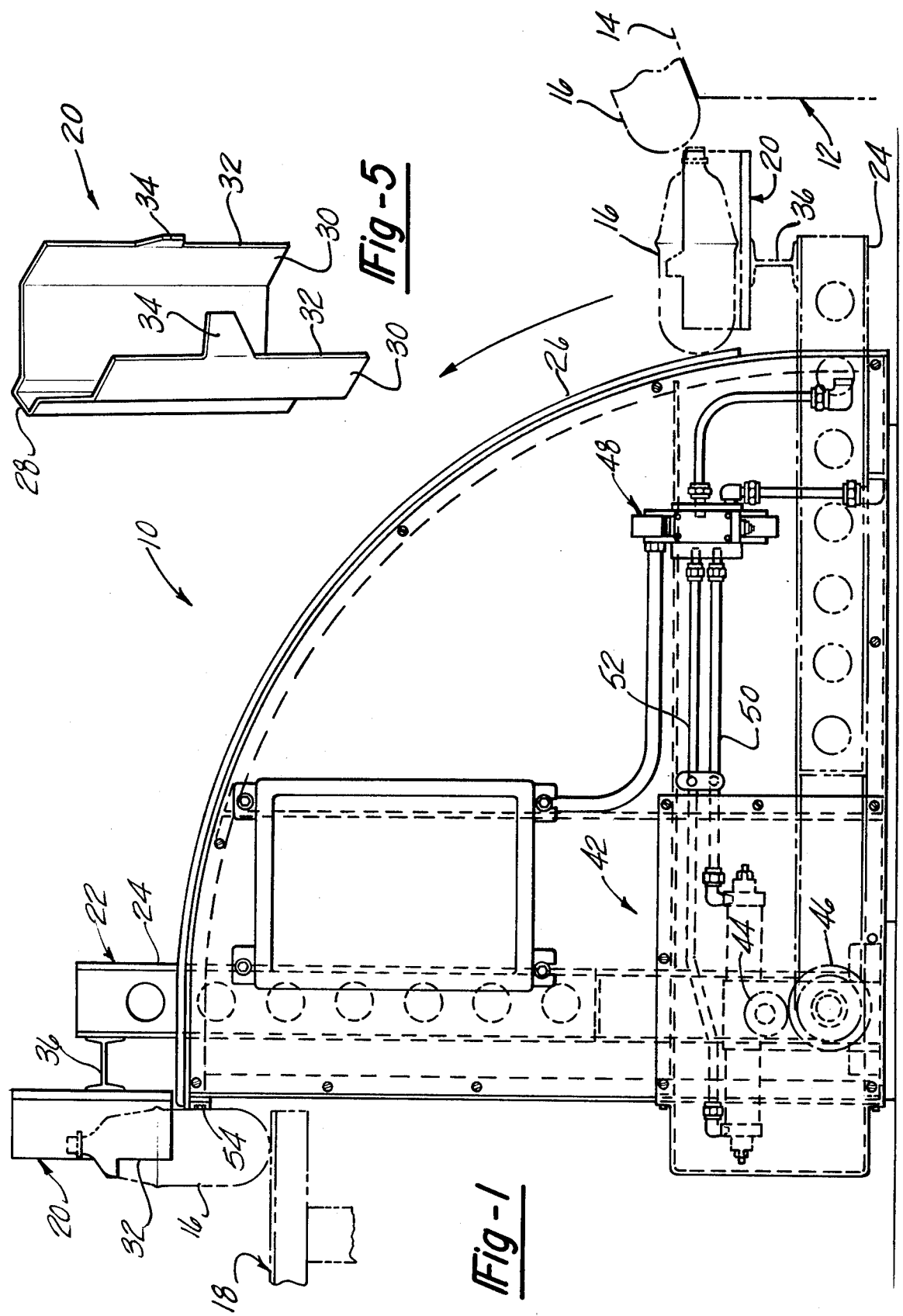
FIG. 1 is a side elevational view of a bottle transfer assembly embodying the present invention, showing the carrier transfer means in solid lines in its elevated position and in broken lines in its lower position.
Figure 2:
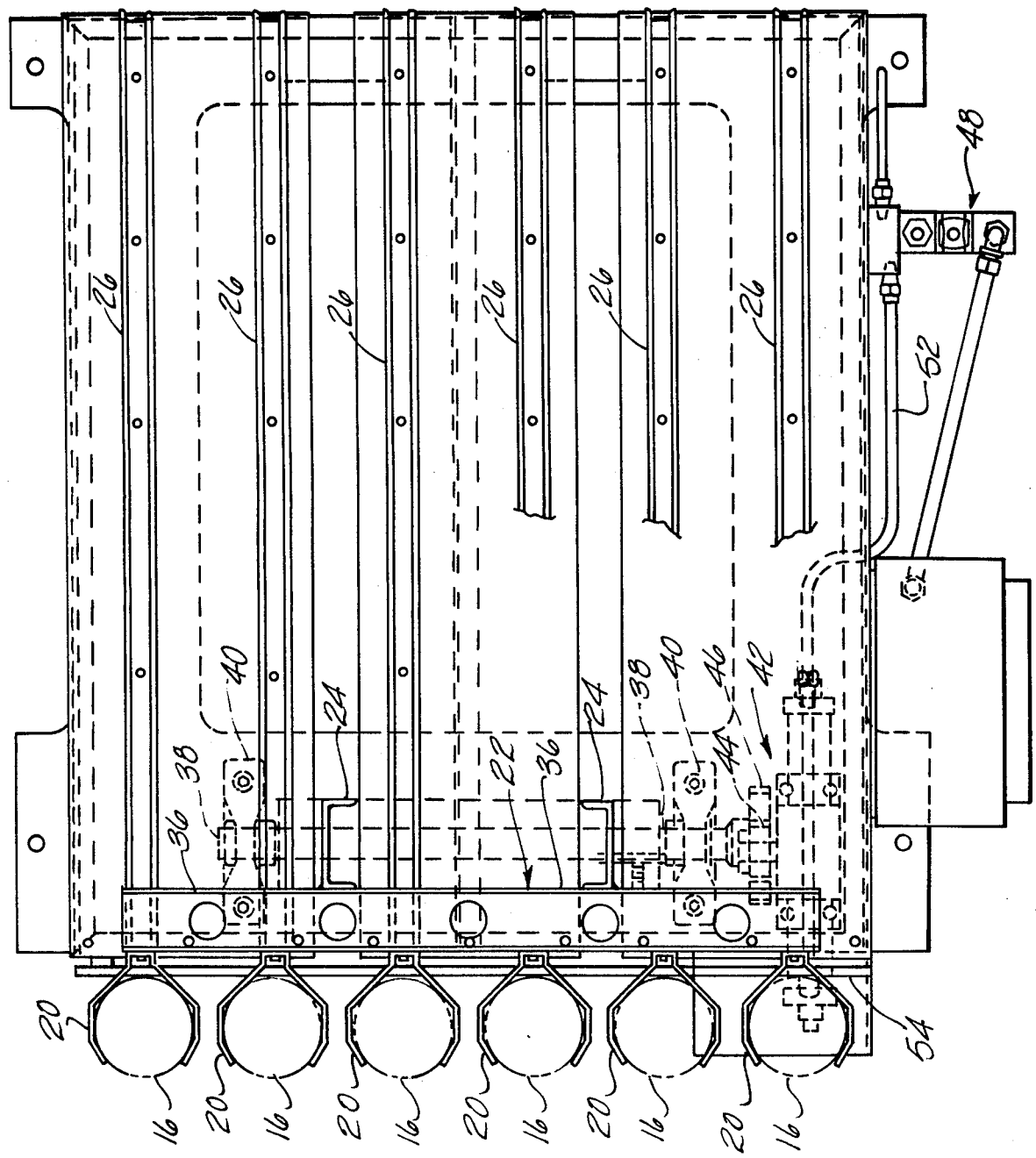
FIG. 2 is a top plan view of the bottle transfer assembly, with portions broken away from the purposes of illustration.
Figure 3:
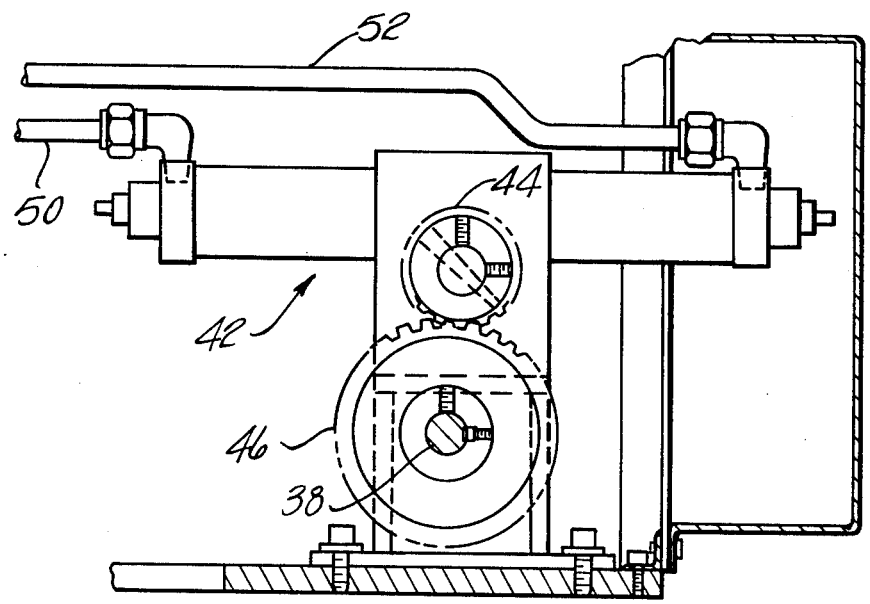
FIG. 3 is an enlarged fragmentary section showing details of the rotary actuator and its connection to the shaft.
Figure 4:
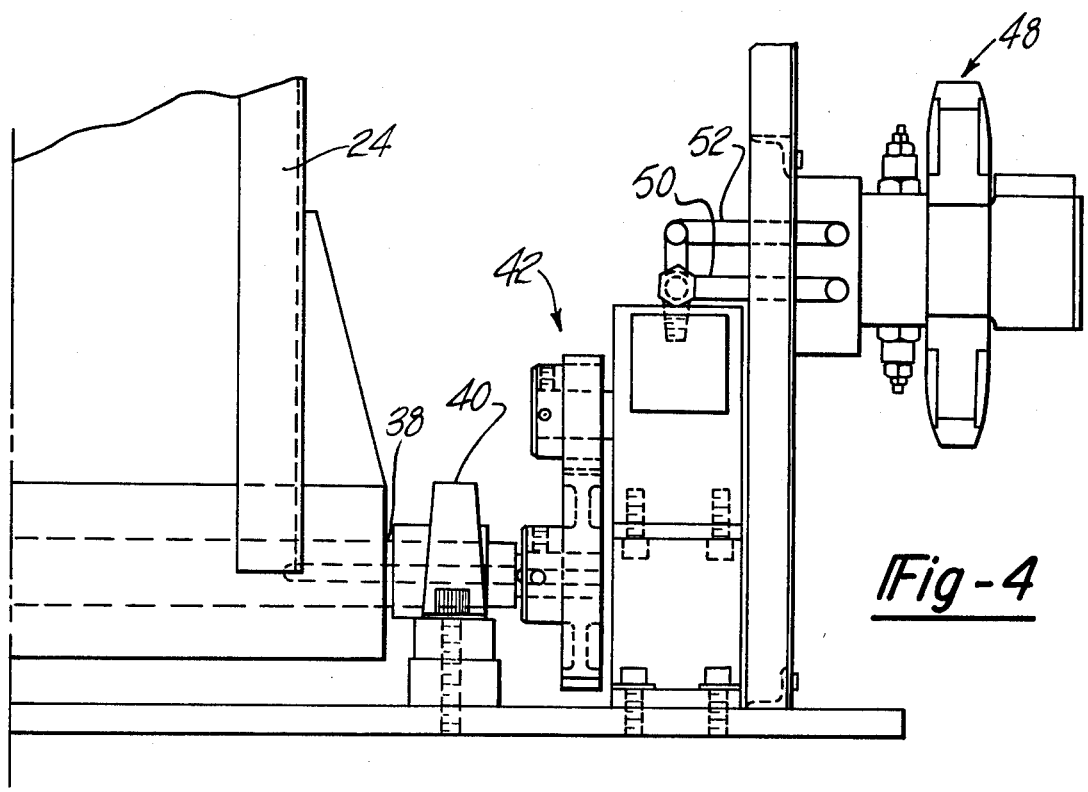
FIG. 4 is a fragmentary front elevational view showing details of the rotary actuator and its solenoid operated directional valve, and their operative connection to the carrier transfer means.

Referring to the drawings, the invention will be described in greater detail. The bottle transfer assembly 10 embodying the present invention is particularly adapted for use in conjunction with a blow molding apparatus 12 that has a plurality of parallel discharge chutes 14, only one of which is shown in FIG. 1, for discharging intermittently a plurality of blown bottles 16 in parallel arrangement, and for transferring the bottles 16 to a suitable receiving member 18. The latter may be a conveyor having a belt on which the bottles can be transferred or may be any other suitable receptacles or conveyance.

The bottle transfer assembly 10 includes a plurality of carriers 20, transfer means 22 connected to the carriers for imparting reciprocal movement to the carriers in paths defined by a quarter of a circle, each located in a vertical plane, wherein one radius of the quarter circle is horizontal and provides a first location for the carriers, and another radius of the quarter circle is vertical and provides a second location for the carriers. In FIG. 1, the horizontal radius corresponds generally to the position of the lift arm 24 shown in broken lines, and the position of the vertical radius corresponds generally to the solid line position of the lift arm 24. The bottle transfer assembly 10 also includes a plurality of arcuate slide members 26, each located in the vertical plane of its associated carrier 20 radially inwardly of the path of movement of the associated carrier 20. The arcuate slide members 26 extend from positions adjacent to the horizontal positions or first locations of the carriers 20 wherein the arcuate slide members function as limit stops for the bottoms of the bottles 16 as can be seen in FIG. 1, and the arcuate slide members terminate at their upper ends immediately short of the end of the paths of movement of the bottles 16 so that the bottles can then fall by gravity from the carriers 20 at their second locations onto the receiving member 18 to the positions shown in FIG. 1. As there seen, the receiving member 18 is preferably located at an elevation so that the containers 16 will not fall completely from the carriers 20 but will remain within the confines of the carriers 20 so that the latter can hold them in their upright positions.

Referring to FIG. 5, a preferred form of the carrier is shown. The carrier 20 has a base 28 for mounting it on the transfer means 22 and it has a generally tubular shape open at opposite ends so that bottles 16 can be discharged bottom-first from chutes 16 into the forward or open ends of the carrier 20 and can be fed therethrough until the bottoms of the bottles engage the arcuate slide members 26. The side walls of the carriers confine the bottle 16, but the side walls are notched as at 32 so that when the bottles 16 are discharged off the upper ends of the arcuate slide members 26, the notched portions at 32 provide sufficient clearance so that the carriers 20 can be returned to their horizontal positions without engaging the bottles 16 that still remain in stationary positions on the receiving member 18. Thus, the tabs 34 serve to retain the bottles 16 in the carriers during the quarter circle travel so that they are not inadvertently displaced therefrom during transit from the lower horizontal positions to the upper vertical upright positions, but these tabs 34 do not interfere with return to the carriers after the bottles have been lowered to the receiving member 18. It will be recognized by those skilled in the art that other suitable shapes of the carriers 20 can be employed without departing from the scope of the present invention.

The transfer means 22 is in the form of a T-bar which includes the stems or arms 24 and the cross member 36. The carriers 20 are secured by suitable means to the cross member 36 and the radially inner ends of the stems or arms 24 are mounted on the shaft 38 for rotary movement therewith. The shaft 38 is supported in the pillow blocks 40 for free rotary movement about the axis of the shaft 38.

The transfer means 22 also includes an actuator 42 for imparting the reciprocal movement to the lift arms 24 and the carriers 20. For this purpose, a conventional hydraulically actuated rotary actuator is employed which is of a conventional type having an output drive gear 44 that is drivingly engaged with the driven gear 46 that is secured to the shaft 38. A conventional solenoid operated directional valve assembly 48 is provided for controlling the flow of the hydraulic fluid to and from the conventional rotary actuator 42 via the conduits 50 and 52. Thus, when the solenoid operated directional valve 48 is energized to discharge hydraulic fluid under pressure through one of the conduits 50, 52, the rotary actuator 42 will rotate the shaft 38 in one direction a quarter of a circle about the shaft axis, and when the solenoid operated directional valve 42 directs fluid through the other of the conduits 50, 52 the rotary actuator 42 will reciprocate the shaft 38 in the other direction a quarter of a circle. Thus, by employment of suitable control switches for energizing when desired the solenoid operated directional valve 48 in conjunction with operation of the blow molding apparatus 12, the bottles discharged from the apparatus 12 can be transferred from the horizontal position to the vertical position shown in FIG. 1. Likewise, suitable controls will allow the carriers 20 to be returned from the vertical position to the horizontal position at the proper time to receive another group of bottles discharged from the apparatus 12.

To facilitate removal of bottles 16 deposited on the receiving member 18, a transverse slide member 54 is located perpendicularly to the vertical planes in which the carriers 20 travel and below the terminal ends of the arcuate slide members 26 for engagement by the side walls of bottles released from the carriers 20. The transverse slide member 54 as well as the arcuate slide members 26 are preferably extrudates of thermoplastic material.

It is claimed:

1. A bottle transfer assembly for transferring bottles from a horizontal position at a first elevation to a vertical upright position at a second elevation and releasing the upright bottles at the second elevation onto a suitable receiving member, characterized in that said assembly comprises a carrier, transfer means connected to said carrier for imparting reciprocal movement to the carrier in a path defined by a quarter of a circle located in a vertical plane wherein one radius of the quarter circle is horizontal and another radius of the quarter circle is vertical, and an arcuate slide member located in said vertical plane in generally parallel relationship to and radially inwardly of said path, said carrier having a generally tubular shape and being open at opposite ends, the axis of said carrier extending towards the center of said circle so that a bottle in a horizontal position can be inserted bottom-first into one end of said carrier at the elevation of said one radius and with said bottom traveling on said slide can be transferred by said transfer means to said second elevation, said slide member terminating substantially at said vertical radius so that said bottle can travel off said slide member and be released bottom-first from the other end of said carrier at said second elevation for deposit of the bottle in an upright position on said receiving member.

2. A bottle transfer assembly such as is defined in claim 1, characterized in that said carrier is one of a plurality of carriers arranged in parallel spaced relation, said transfer means being connected to said carriers for imparting reciprocal movement simultaneously to said carriers, and a plurality of arcuate slide members are provided corresponding to the one said slide member, each slide member being associated with a carrier for receiving in sliding engagement a bottle carried in the associated carrier.

3. A bottle transfer assembly such as is defined in claim 2, characterized in that a transverse slide member is located perpendicularly to said vertical plane and below the respective elevated terminal ends of said arcuate slide members for engagement by the side walls of bottles released from said carriers.

4. A bottle transfer assembly such as is defined in claim 1, characterized in that said other end of said carrier is notched so that when said bottle is deposited in an upright position on said receiving member, the carrier can be returned to the bottle-inserting position and the notch will provide clearance for passage of the upper end of the released bottle through the carrier.

5. A bottle transfer assembly such as is defined in claim 1, characterized in that said arcuate slide member is an extrudate of organic plastics material.

6. A bottle transfer assembly such as is defined in claim 1, characterized in that said transfer means comprises a shaft mounted for rotation about its axis, a lift arm connected at its one end to said shaft for rotation therewith, the distal end of said lift arm having means for connection to said carrier, and an actuator connected to said shaft for rotating the shaft about its axis in either direction of rotation.

7. A bottle transfer assembly such as is defined in in claim 6, characterized in that said actuator comprises a rotary cylinder operatively connected to said shaft, and a solenoid operated directional valve for directing fluid to and from said rotary cylinder.

8. A bottle transfer assembly for transferring bottles from a horizontal position at a first elevation to a vertical upright position at a second elevation and releasing the upright bottles at the second elevation, characterized in that said assembly comprises a carrier of sleeve-like construction that has a longitudinal axis and is open at opposite ends for axial passage therethrough of a bottle, carrier transfer means connected to said carrier for imparting reciprocal movement to the carrier in a vertical quarter-circle path, said carrier being connected to the transfer means so that the longitudinal axis of the carrier intersects the center of said quarter-circle path, an actuator connected to said carrier transfer means to reciprocate said carrier transfer means between a first position wherein said carrier is disposed with its axis in a horizontal position and a second position wherein said carrier is disposed with its axis in an elevated vertical position, and an arcuate slide member mounted so that it is located radially inwardly of the path of movement of said carrier so as to act as a stop for limiting the passage of a bottle through said carrier, said slide member terminating immediately prior to said vertical position of said carrier so that when the carrier arrives at its vertical position the bottle therein can fall by gravity therefrom in an upright position.

9. A bottle transfer assembly such as is defined in claim 8, characterized in that said carrier transfer means includes a T-bar having a stem and a cross member secured to the upper end of said stem, said stem being pivotally mounted at its lower end for reciprocal movement, said cross member supporting said carrier so that said longitudinal axis of the carrier intersects the axis of pivotal movement of said stem, said carrier being one of a plurality of carriers connected on parallel relation to said cross member, and said slide member being one of a plurality of parallel slide members disposed radially inwardly of said cross member.

10. A bottle transfer assembly such as is defined in claim 8, characterized in that said sleeve-like construction has a notch therein to permit lateral passage therethrough of the upper end of a bottle when the carrier is at its vertical position and the bottle has descended to a position below the limiting position of said slide member.

* * * * *